(12) United States Patent
Hangleiter

(10) Patent No.: US 8,556,554 B2
(45) Date of Patent: Oct. 15, 2013

(54) CHUCK FOR A TUBULAR BODY

(75) Inventor: Eugen Hangleiter, Hermaringen (DE)

(73) Assignee: ROEHM GmbH, Sontheim (DE)

( * ) Notice: Subject to any disclaimer, the term of this patent is extended or adjusted under 35 U.S.C. 154(b) by 911 days.

(21) Appl. No.: 12/602,667

(22) PCT Filed: May 31, 2008

(86) PCT No.: PCT/DE2008/001096
§ 371 (c)(1),
(2), (4) Date: Dec. 2, 2009

(87) PCT Pub. No.: WO2009/010037
PCT Pub. Date: Jan. 22, 2009

(65) Prior Publication Data
US 2010/0201083 A1 Aug. 12, 2010

(30) Foreign Application Priority Data
Jul. 16, 2007 (DE) .......................... 10 2007 033 350

(51) Int. Cl.
*B23C 5/26* (2006.01)
*B23B 31/26* (2006.01)

(52) U.S. Cl.
USPC ....... 409/233; 408/239 R; 279/108; 279/2.12; 279/2.15

(58) Field of Classification Search
CPC ........ B23B 31/261; B23B 31/265; B23C 5/26
USPC .......................... 409/233, 231, 232, 136, 135; 408/239 R, 239 A; 279/108, 2.12, 2.14, 279/2.15
See application file for complete search history.

(56) References Cited

U.S. PATENT DOCUMENTS

| 5,035,557 | A | * | 7/1991 | Kohlbauer et al. | 409/233 |
| 5,509,763 | A | | 4/1996 | Reinauer et al. | |
| 5,865,578 | A | * | 2/1999 | Benedikter et al. | 409/233 |
| 6,419,430 | B2 | | 7/2002 | Hangleiter | |
| 6,568,888 | B2 | | 5/2003 | Hangleiter | |
| 6,923,605 | B2 | * | 8/2005 | Jakob et al. | 409/233 |
| 7,195,431 | B2 | * | 3/2007 | Greif et al. | 409/233 |

FOREIGN PATENT DOCUMENTS

DE 10309242 A1 * 9/2004

* cited by examiner

*Primary Examiner* — Erica E Cadugan
(74) *Attorney, Agent, or Firm* — Andrew Wilford

(57) ABSTRACT

A chuck for a tubular body having a noncircular outer surface and an interior formed with a gripping formation has a spindle extending along an axis, axially displaceable claws in the spindle each having a pair of opposite ends, and a gripper head engageable with one of the ends of each of the claws in the spindle. This head is displaceable between a holding position in which the claws engage the gripping formation in the tubular-body interior and an open position disengaged from the gripping formation. The jaws move on displacement between the open position and the holding position by engagement of the gripper head with their one ends in a first pivotal movement and then at their other ends in a second pivotal movement to press their other ends against the working spindle.

15 Claims, 5 Drawing Sheets

CHUCK FOR A TUBULAR BODY

CROSS REFERENCE TO RELATED APPLICATIONS

This application is the US-national stage of PCT application PCT/DE2008/001096, filed 31 May 2008, published 22 Jan. 2009 as WO2009/010037, and claiming the priority of German patent application 102007033350.3 itself filed 16 Jul. 2007.

FIELD OF THE INVENTION

The invention relates to a chuck for a tubular body, in particular a tapered tubular body having a noncircular outer surface such as a polygonal tapered tubular body, comprising claws axially displaceable by a gripper head in a working spindle between a holding position in which the claws engage with a gripping formation in the tubular-body interior and an open position with the gripping formation disengaged.

BACKGROUND OF THE INVENTION

Such a chuck is known from DE 299 22 642 [U.S. Pat. No. 6,419,430], in which the claws are pivoted about an axis by means of the gripper head for displacement between an open position and the holding position. This chuck has proved effective in practice, but in order to produce sufficient gripping force it requires relatively large axial displacement of the gripper head, this being associated with a correspondingly long construction of the chuck.

OBJECT OF THE INVENTION

The basic object of the invention is therefore to provide a chuck of the type cited above such that a shorter displacement path for the gripper head is sufficient for attaining high gripping force.

SUMMARY OF THE INVENTION

This object is attained according to the invention in a chuck of the type described above in that for displacement between the open position and the holding position the claws are displaceable by the gripper head at their one end in a first pivotal movement and then at the other end in a second pivotal movement against the working spindle.

In this inventive chuck it is advantageous that in the first pivotal movement the claws can move toward and be positioned at the gripping formation while the required gripping force is produced with another, second pivotal movement of the claws, subsequent axial movement by the gripper head not being required to is produce the necessary strong gripping force.

Moreover, it has proven favorable when the claws are levers each having a head and a foot, and when the gripper head has two axially spaced ridges, of which the first ridge serves to pivot the heads and the second ridge to pivot the feet. In this embodiment, the two different movement types for the claws are produced unchanged by the axial, linear displacement of the gripper head, the axial spacing of the ridges being dimensioned such that, when displaced from the open position to the holding position, the first ridge initially pivots the claws so that the heads engage the gripping formation and then the second pivoting is effected by the second ridge at the feet. As a result the time-offset pivotal movements is controlled by the appropriate spacing between the two ridges.

Very particularly preferred is an embodiment that is characterized in that each foot has a radially outwardly directed first inclined surface that bears against the working spindle with a complementarily angled support surface, and in that each foot has a radially inwardly directed second inclined surface that coacts with the gripper head with a complementarily angled support surface on the second ridge. By appropriately selecting their orientations, these two inclined surfaces provide the opportunity, using force multiplication, to effect an increase in the gripping force and to cause a pull-down effect when a corresponding displacement of the claws is effected due to engagement of the heads in the gripping formation and the displacement of the feet of the claws on the support surface of the working spindle. It has proven useful when the first inclined surface is inclined 15° to 75°, preferably 45°, relative to the radial direction, while the second inclined surface is inclined 5° to 30°, preferably 15°, relative to the axial direction. These angles of inclination permit favorable transmission without the risk of locking.

In order to attain favorable symmetrical gripping conditions, in the framework of the invention furthermore the design is such that a plurality of claws, preferably 6 claws, are provided and are arranged distributed uniformly around the circumference.

In order to attain secure positioning of the feet against the second ridge with reduced clearance, the feet of the claws are acted upon by an element that is prestressed radially inwardly and that is preferably formed by an annular spring.

For producing and assembling the inventive chuck, it is preferred that the working spindle have a flange that can be inserted into its free end, on which flange the support surface associated with the first inclined surface is formed, because then it is possible to position the gripper head and the claws in the working position first and then finally to assemble the working spindle with the flange.

In addition, according to the invention the gripper head has a throughgoing passage for a fluid so that coolant and lubricant can be conveyed through the passage to the tool supporting the tubular body or to the workpiece.

In addition, arranged on the axially inwardly directed side of the claws is a check valve that is open in the open position and closed in the holding position and that prevents the coolant and lubricant from penetrating into the bearing of the gripper head inside the working spindle and that also makes it possible to displace the coolant and lubricant from the working spindle by using compressed air when the chuck is in the open position when changing the tubular body.

It has proven useful that the check valve has a valve sleeve that is acted upon by the force of a sleeve spring and that in the open position bears against an abutment that is associated with the gripper head for opening the check valve, the valve sleeve being borne in a fixed sleeve that bears against the claws and that receives the sleeve spring.

BRIEF DESCRIPTION OF THE DRAWING

The invention is explained in greater detail in the following with reference to an embodiment shown in the drawings.

DETAILED DESCRIPTION OF THE INVENTION

Figure 1:
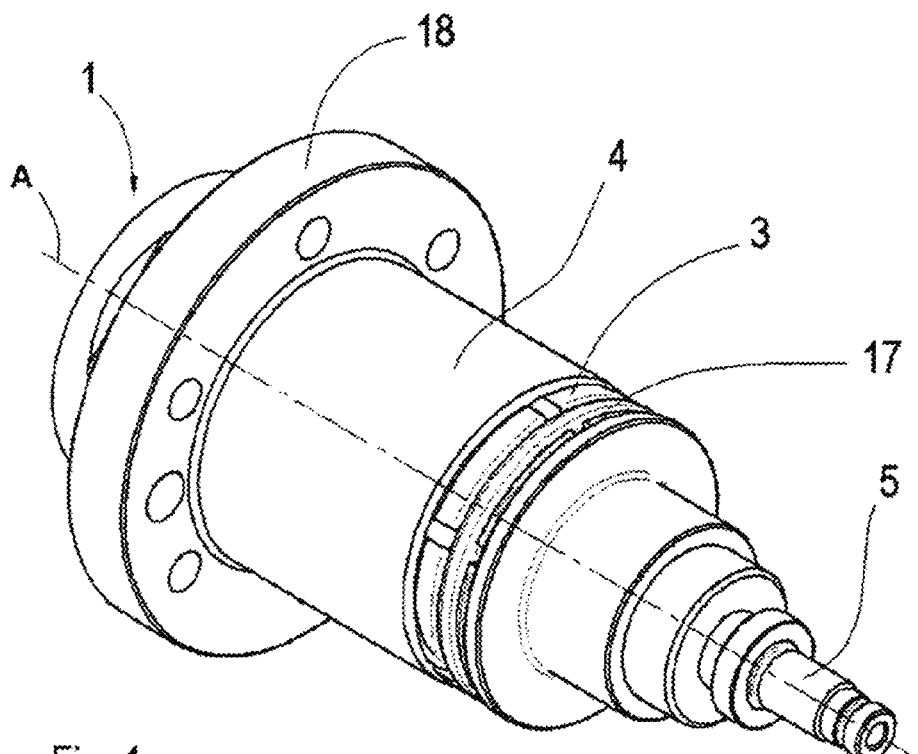
FIG. 1 is a perspective elevation of an inventive chuck with the flange.
Figure 2:
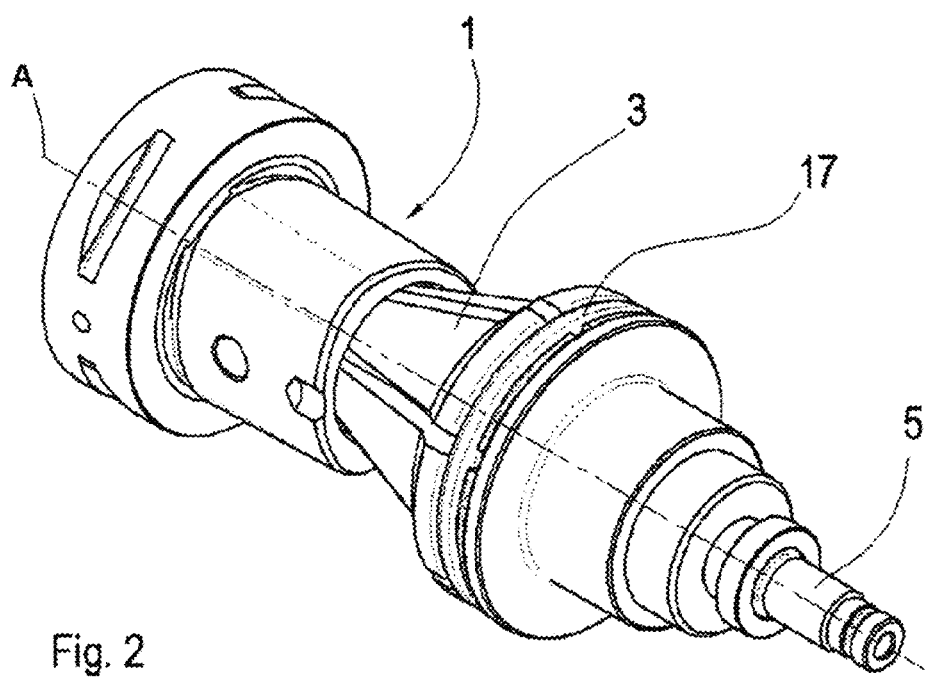
FIG. 2 shows the chuck in FIG. 1 without the flange.
Figure 3:
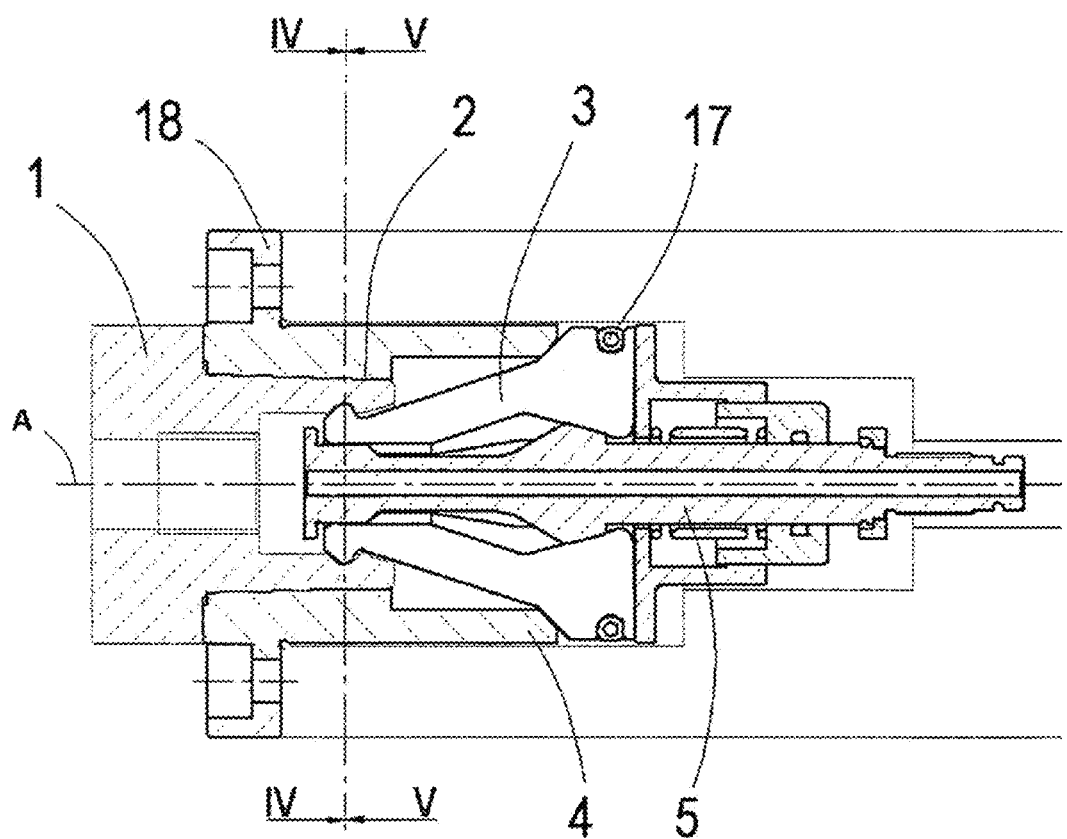
FIG. 3 is a schematic longitudinal section through the chuck mounted in a working spindle.

FIG. 2 shows an inventive chuck together with a tubular body 1 to be gripped, it being noted that the illustrated tubular body 1 has a polygonal-section tapered outer surface 2 of noncircular shape so that because of this shape of the outer surface of the tapered tubular body 2 it is possible to transmit torque without having to resort to more complex formations like grooves. For adapting to the outer surface of the polygonal tapered tubular body 2, the working spindle 4 also has a flange 18, shown in FIG. 1 but not in FIG. 2, whose inner surface is complementary to the outer surface 2 as can be seen in particular also in FIGS. 4 and 5 in accordance with the section lines from FIG. 3.

The chuck furthermore has claws 3 (see FIGS. 6 through 9) that can be operated by a gripper head 5 that is axially displaceable in the working spindle 4 between a holding position in which the claws 3 in the tubular-body interior 7 are engaged with a gripping formation 6 and an open position that does not engage the gripping formation 6. The claws 3 are formed as gripping levers each having a head 8 and a foot 9, the gripper head 5 being formed at the same axial spacing with two head ridges 10 and 11, of which the first head ridge 10 serves to pivot the head 8 and the second ridge 11 to pivot the foot 9. The axial spacing of the ridges 10 and 11 is dimensioned such that, when displaced from the open position to the holding position, the first ridge 10 first pivots the claws in a first pivoting movement that engages the heads 8 with the gripping formation 6 and then the second pivoting is caused by engagement of the second ridge 11 with the feet 9 to increase the gripping force.

Figure 6:
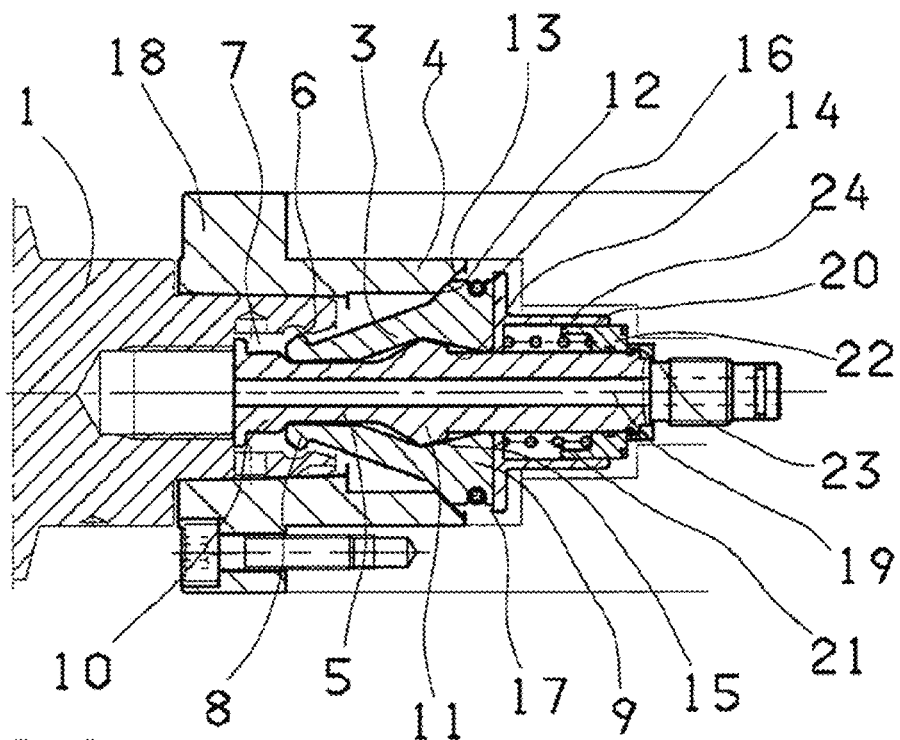
FIG. 6 is a longitudinal section through the chuck mounted in the working spindle in the open position.

Furthermore, it can be seen from FIG. 6 that the feet 9 each have a radially outwardly directed first inclined surface 12 that bears against a complementarily angled surface 13 of the working spindle 4, specifically the flange 18. Moreover, the foot 9 has a radially inwardly directed second inclined surface 14 that bears against the gripper head 5 with a corresponding inclined support surface 15 on the second ridge 11. The first inclined surface 12 is inclined 15° to 75°, preferably 45°, relative to the radial direction, while the second inclined surface 14 is inclined 5° to 30°, preferably 15°, relative to the axial direction, so that appropriately selecting the orientation of the inclined surfaces 12 and 14 with the respective support surfaces 13 and 15 produces an increase in force and a pull-down effect that leads to secure gripping of the tubular body 1.

Figure 4:
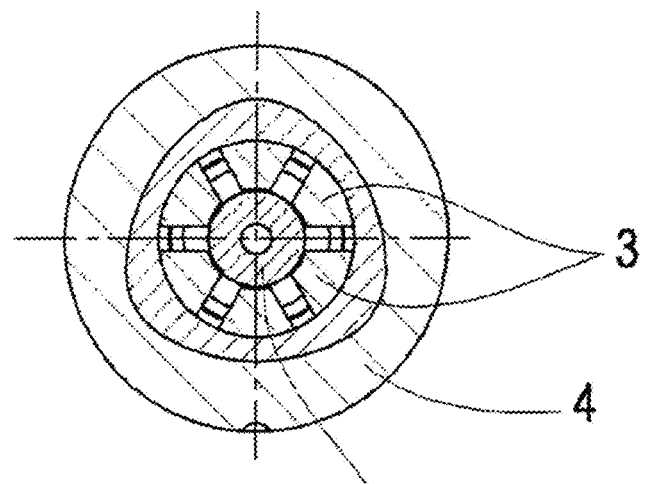
FIG. 4 is section IV-IV from FIG. 3.
Figure 5:
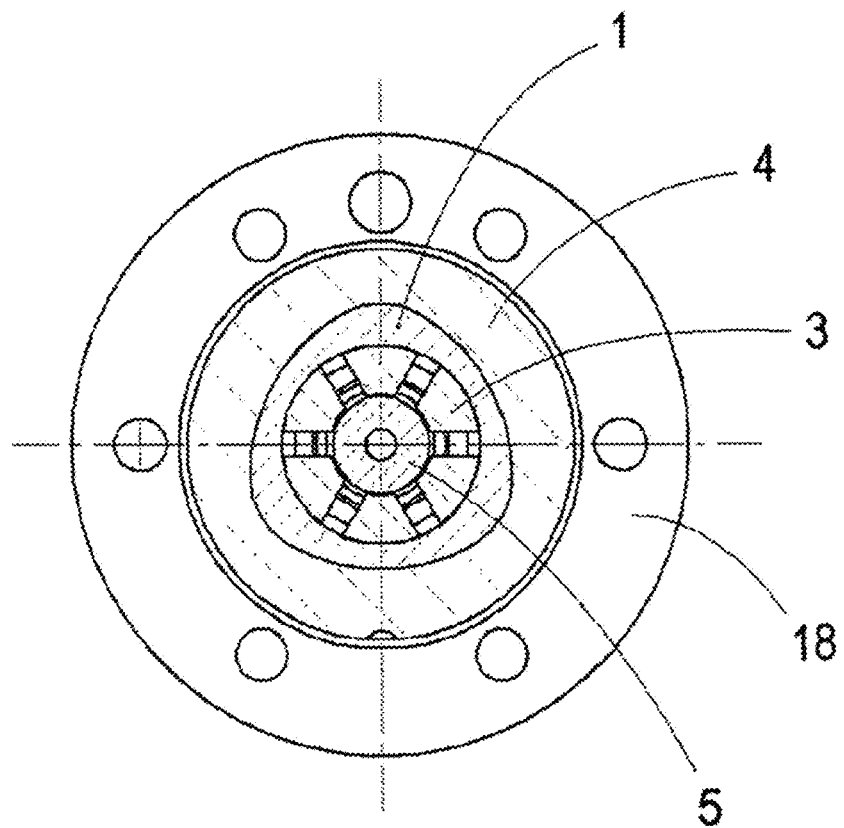
FIG. 5 is section V-V from FIG. 3.
Figure 7:
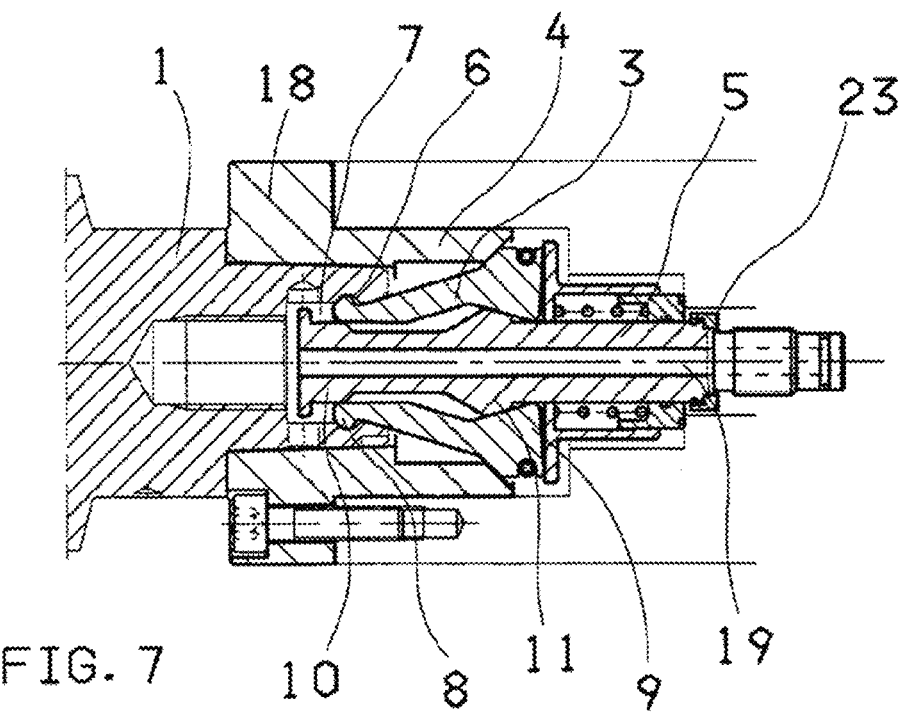
FIG. 7 shows the chuck in FIG. 6 at the beginning of the gripping process.
Figure 8:
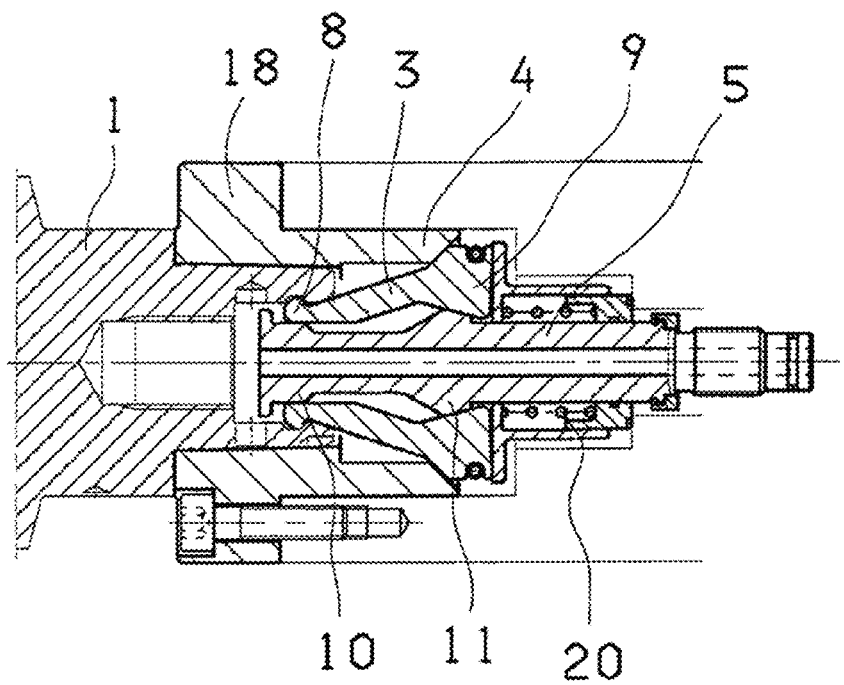
FIG. 8 shows the chuck in FIG. 6 with the chuck in the holding position.
Figure 9:
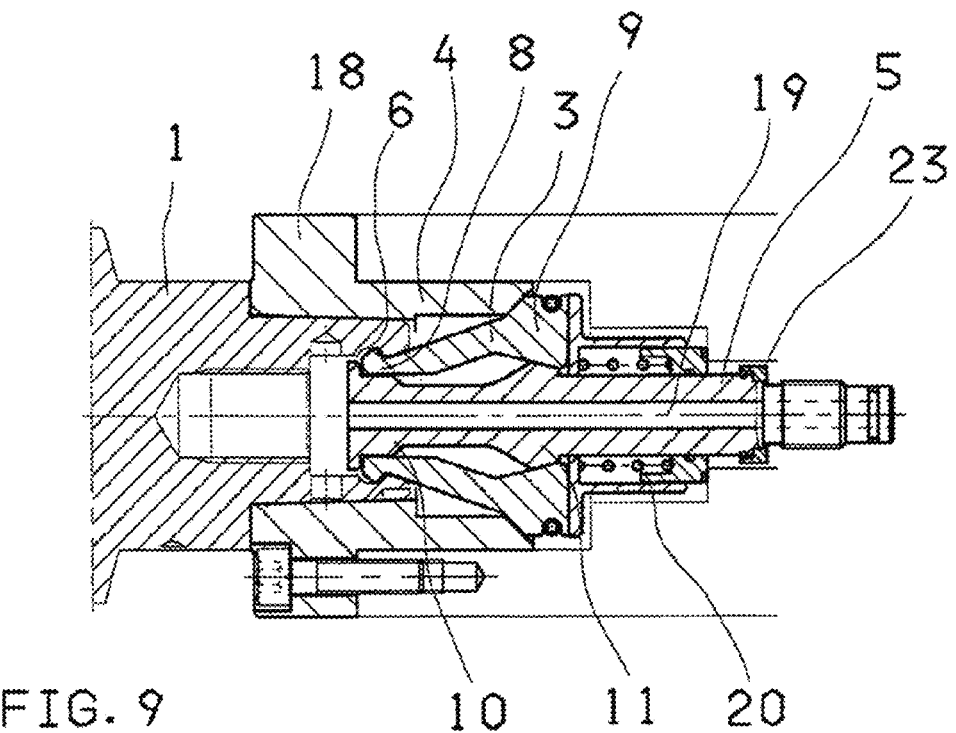
FIG. 9 shows the chuck in FIG. 6 with the chuck at the end of the gripping travel.

As can be seen from FIGS. 4 and 5, a plurality of angularly equispaced claws 3, specifically six, are provided. The feet 9 are acted upon by a biasing unit 16, specifically an annular spring 17, that is prestressed radially inwardly (FIG. 6). The gripper head 5 has an axially throughgoing passage 19 for a fluid, specifically a coolant and lubricant, that can flow into and fill the space enclosed by the flange 18 and into the tubular body 1, a check valve 20 that is open in the open position and closed in the holding position being arranged on the axially inwardly directed side of the claws 3 such that it seals the space that has been filled. The check valve 20 has a valve sleeve 22 that is acted upon by a sleeve spring 21 and that in the open position bears against an abutment 23 on the gripper head 5 for opening the check valve 20 and is carried in a fixed sleeve 24 that bears against the claws 3 and that holds the sleeve spring 21. The fixed sleeve 24 not only bears against the claws 3, but also presses the valve sleeve against the support surface 13 and in the open position pivots the claws 3 inward using inclined support surfaces on the foot 9 (FIG. 7).

The invention claimed is:

1. A chuck for a tubular body having a noncircular outer surface and an interior formed with a gripping formation, the chuck comprising:
   a spindle extending along an axis;
   axially displaceable claws in the spindle each having a pair of opposite ends; and
   a gripper head engageable with one of the ends of each of the claws in the spindle and configured for axially displacing the claws between a holding position in which the claws engage the gripping formation in the tubular-body interior and an open position disengaged from the gripping formation, with the claws being moved between the open position and the holding position by the gripper head at their one ends in a first pivotal claw movement and then at their other ends in a second pivotal claw movement to press their other ends against the spindle.

2. The chuck in accordance with claim 1, wherein the claws are levers each having a head forming the respective one end and a foot forming the respective other end, the gripper head having first and second axially spaced ridges, the first ridge serving to pivot the heads and the second ridge to pivot the feet.

3. The chuck in accordance with claim 2, wherein an axial spacing of the ridges is such that, when the claws are displaced from the open position to the holding position, the first ridge initially pivots the one ends of the claws in the first pivotal movement to engage their heads with the gripping formation and then the second pivotal movement is effected by the second ridge at the feet.

4. The chuck in accordance with claim 3, wherein the feet each have
   a first inclined surface angled relative to the axis and bearing against a complementarily angled support surface of the spindle and
   a second inclined surface angled relative to the axis at the gripper head and engageable with a complementarily angled support surface on the second ridge.

5. The chuck in accordance with claim 4, wherein each of the first inclined surfaces is inclined 15° to 75° relative to a line extending radially with respect to the axis.

6. The chuck in accordance with claim 4, wherein each of the second inclined surfaces is inclined 5° to 30° relative to the axis.

7. The chuck in accordance with claim 4, wherein the spindle has a flange having the support surface engageable with the first inclined surfaces on the other ends of the feet.

8. The chuck in accordance with claim 1, wherein the claws are angularly equispaced about the axis.

9. The chuck in accordance with claim 1, further comprising:
   biasing means engaging the other ends of the claws and biasing the same radially inward.

10. The chuck in accordance with claim 9, wherein the biasing means is an annular spring.

11. The chuck in accordance with claim 1, wherein the gripper head is formed with a throughgoing passage for a fluid.

12. The chuck in accordance with claim 1, further comprising:
a check valve open in the open position of the claws and closed in the holding position of the claws.

13. The chuck in accordance with claim 12, wherein the check valve has a valve sleeve that is acted upon by a sleeve spring and that in the open position of the claws bears against an abutment on the gripper head for opening the check valve.

14. The chuck in accordance with claim 13, wherein the check valve further has a fixed sleeve that carries the valve sleeve, that bears against the claws, and that holds the sleeve spring.

15. The chuck in accordance with claim 14, wherein, for actuating the claws using the sleeve spring and for pivoting the claws into the open position, the fixed sleeve cooperates with a surface of the spindle.

* * * * *